United States Patent
Takabatake et al.

(10) Patent No.: US 10,100,671 B2
(45) Date of Patent: Oct. 16, 2018

(54) OIL DRAIN FOR THE BEARING HOUSING OF A TURBOCHARGER

(71) Applicant: BorgWarner Inc., Auburn Hills, MI (US)

(72) Inventors: Lauro Takabatake, Sao Paulo (BR); Douglas Gusmao, San Paulo (BR)

(73) Assignee: BorgWarner Inc., Auburn Hills, MI (US)

( * ) Notice: Subject to any disclaimer, the term of this patent is extended or adjusted under 35 U.S.C. 154(b) by 290 days.

(21) Appl. No.: 14/655,972

(22) PCT Filed: Dec. 9, 2013

(86) PCT No.: PCT/US2013/073818
§ 371 (c)(1),
(2) Date: Jun. 26, 2015

(87) PCT Pub. No.: WO2014/109849
PCT Pub. Date: Jul. 17, 2014

(65) Prior Publication Data
US 2015/0369081 A1    Dec. 24, 2015

Related U.S. Application Data

(60) Provisional application No. 61/750,114, filed on Jan. 8, 2013.

(51) Int. Cl.
| | | |
|---|---|---|
| *F01D 25/18* | (2006.01) |
| *F02B 39/14* | (2006.01) |
| *F01D 25/16* | (2006.01) |
| *F01D 5/02* | (2006.01) |
| *F02B 37/00* | (2006.01) |
| *F16N 31/00* | (2006.01) |

(52) U.S. Cl.
CPC ............ *F01D 25/18* (2013.01); *F01D 5/02* (2013.01); *F01D 25/162* (2013.01); *F01D 25/166* (2013.01); *F02B 37/00* (2013.01); *F02B 39/14* (2013.01); *F05D 2220/40* (2013.01); *F05D 2240/50* (2013.01); *F05D 2260/602* (2013.01); *F05D 2260/98* (2013.01); *F16N 31/00* (2013.01)

(58) Field of Classification Search
CPC ........ F01D 25/18; F01D 25/16; F01D 25/162; F01D 25/20; F01D 25/166; F01D 25/32
See application file for complete search history.

(56) References Cited

U.S. PATENT DOCUMENTS

| | | | |
|---|---|---|---|
| 4,010,727 A * | 3/1977 | Cross | .............. F01L 7/024 123/190.16 |
| 5,494,355 A | 2/1996 | Hasse | |

(Continued)

FOREIGN PATENT DOCUMENTS

| | | |
|---|---|---|
| CN | 101344031 | 1/2009 |
| JP | 2010065682 | 3/2010 |
| KR | 1020090062813 | 6/2009 |

*Primary Examiner* — Jason Shanske
*Assistant Examiner* — Cameron Corday
(74) *Attorney, Agent, or Firm* — Young Basile Hanlon & MacFarlane, P.C.

(57) ABSTRACT

An oil drain (8) in a turbocharger bearing housing (1) is provided in which the oil flows out along the outer edge of the oil drain (8) leaving the center of the drain (8) open. Air can flow between the bearing housing (1) and the oil sump allowing for an equalization of air pressure therebetween.

6 Claims, 5 Drawing Sheets

(56) References Cited

U.S. PATENT DOCUMENTS

| | | | | |
|---|---|---|---|---|
| 7,992,551 B2 * | 8/2011 | Shieh | ............... | F01M 13/04 |
| | | | | 123/572 |
| 8,181,746 B2 * | 5/2012 | Szolomayer | ........... | B01D 45/16 |
| | | | | 137/38 |
| 9,163,641 B2 * | 10/2015 | Tombers | ............... | F01D 25/18 |
| 2004/0197212 A1 * | 10/2004 | Roby | ............... | F01D 25/125 |
| | | | | 417/407 |
| 2012/0060508 A1 * | 3/2012 | Alecu | ............... | F01D 25/20 |
| | | | | 60/783 |

* cited by examiner

OIL DRAIN FOR THE BEARING HOUSING OF A TURBOCHARGER

CROSS-REFERENCE TO RELATED APPLICATION

This application claims priority to and all benefits of U.S. Provisional Application No. 61/750,114, filed on Jan. 8, 2013, and entitled "An Oil Drain For The Bearing Housing Of A Turbocharger."

BACKGROUND OF THE INVENTION

Field of the Invention

This invention relates to a turbocharger for an internal combustion engine. More particularly, this invention relates to an oil drain in a turbocharger bearing housing in which the oil flows out along the outer edge of an oil drain leaving the center of the drain open. Air can flow between the bearing housing and the oil sump allowing for an equalization of air pressure. As a result of equalization of air pressure, oil drainage from the bearing housing is enhanced.

Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the engine's exhaust manifold, a compressor housing connected to the engine's intake manifold, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to the engine's cylinders via the engine's intake manifold.

The turbine wheel and the shaft of a turbocharger rotate very fast. The rotation speed of a turbocharger shaft depends upon the size of the turbine wheel and smaller turbine wheels can rotate faster than larger wheels. A turbocharger turbine wheel and shaft used in conjunction with an internal combustion engine may reach circumferential tip speeds of 530 meters per second. The turbine wheel operates in a high temperature environment and may reach temperatures as high as 1922° F. (1050° C.). This heat is conducted by the turbine shaft to the bearing housing. The rapid rotation of the turbine shaft creates frictional forces which further heat the bearing area. Thus, there is a need for lubrication and cooling of the turbocharger shaft and bearing housing. In an oil lubricated turbocharger, oil is pumped to the shaft to provide the necessary lubrication and cooling. In an automotive turbocharger the flow rate of the oil to the bearing can be as a high as 1 gallon per minute. Oil must also be removed from the bearing housing because if it builds up in the housing it could leak through the seals into the compressor housing or the turbine housing. In addition, if the oil remained in the turbocharger bearing housing, it could degrade due to overheating and could even form coke. Generally, oil is not pumped out of the turbocharger housing bearing housing but flows out of the bearing housing by gravity. The oil flows to the engine oil sump where it is cooled and then pumped to lubricate the engine and the turbocharger.

U.S. Pat. No. 7,811,001 and U.S. Pat. No. 7,387,445 relate to a bearing housing. The bearing housing includes a chamber with out-take for oil scavenging. The out-take extends across a chordal arc of the chamber. A portion of an outer wall adjacent to the out-take has a spiral divergence.

U.S. Pat. No. 7,476,090 relates to a turbocharger for an internal combustion engine which includes a center housing connected to a turbine housing and a compressor housing. A shaft is in a bore of the center housing. An oil supply passage is in fluid communication with the bore. An oil drain passage is in fluid communication with an oil cavity and the bore. A vent passage is in fluid communication with the oil cavity and an internal volume of the internal combustion engine. Oil flow passes through the first passage and the drain passage during operation of the internal combustion engine. A first pressure of air in the oil cavity is about equal to a second pressure of air in the internal volume of the internal combustion engine. To avoid an increase of the pressure inside the center housing above the low pressure in the internal volume, a pressure vent tube fluidly connects the center housing with the internal volume. The pressure vent tube ensures that the pressure inside the center housing will be equal to the pressure in the internal volume. By equating the pressures, smooth flow of oil is ensured in the center housing.

SUMMARY OF THE INVENTION

The present invention provides a bearing housing for a turbocharger with an improved oil drain having a flow moderator either in the drain or below the drain. The flow moderator allows the oil draining back to the oil sump to follow a path along the outside of the oil drain while the middle of the oil drain remains open and allows air vent to equalize pressures between the oil sump and the bearing housing. The pressure equalization allows gravity flow of oil from the bearing housing to the oil sump.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

A turbine wheel operates in a high temperature environment and may reach temperatures as high as 1922° F. (1050° C.). This heat is conducted by the turbine shaft to the bearing housing. The rapid rotation of the turbine shaft creates frictional forces which further heats the bearing area. Thus, there is a need for lubricating and cooling the turbocharger shaft. In an oil lubricated turbocharger, oil is pumped to the shaft to provide the necessary lubrication and cooling. In an automotive turbocharger the flow rate of the oil to the bearing housing can be as high as 1 gallon per minute. Oil must also be removed from the bearing housing because if it builds up in the housing it could leak through the seals into the compressor portion of the turbine. The present invention provides a turbocharger bearing housing oil drain having a flow moderator which allows the oil to flow by gravity along the outside wall of the oil drain while the center of the oil drain remains open and allows air to flow between the bearing housing and the oil sump. The flow moderator may be spirals in the oil drain, or ribs which guide the oil to flow in a swirling manner. The spirals are indentations in the wall of the oil drain. The flow moderator may be a plate, having ribs, placed directly below the oil drain. The flow of air between the sump and the bearing housing and the oil sump equalizes the pressure, and thus allows the oil to drain more easily from the bearing housing.

Figure 1:
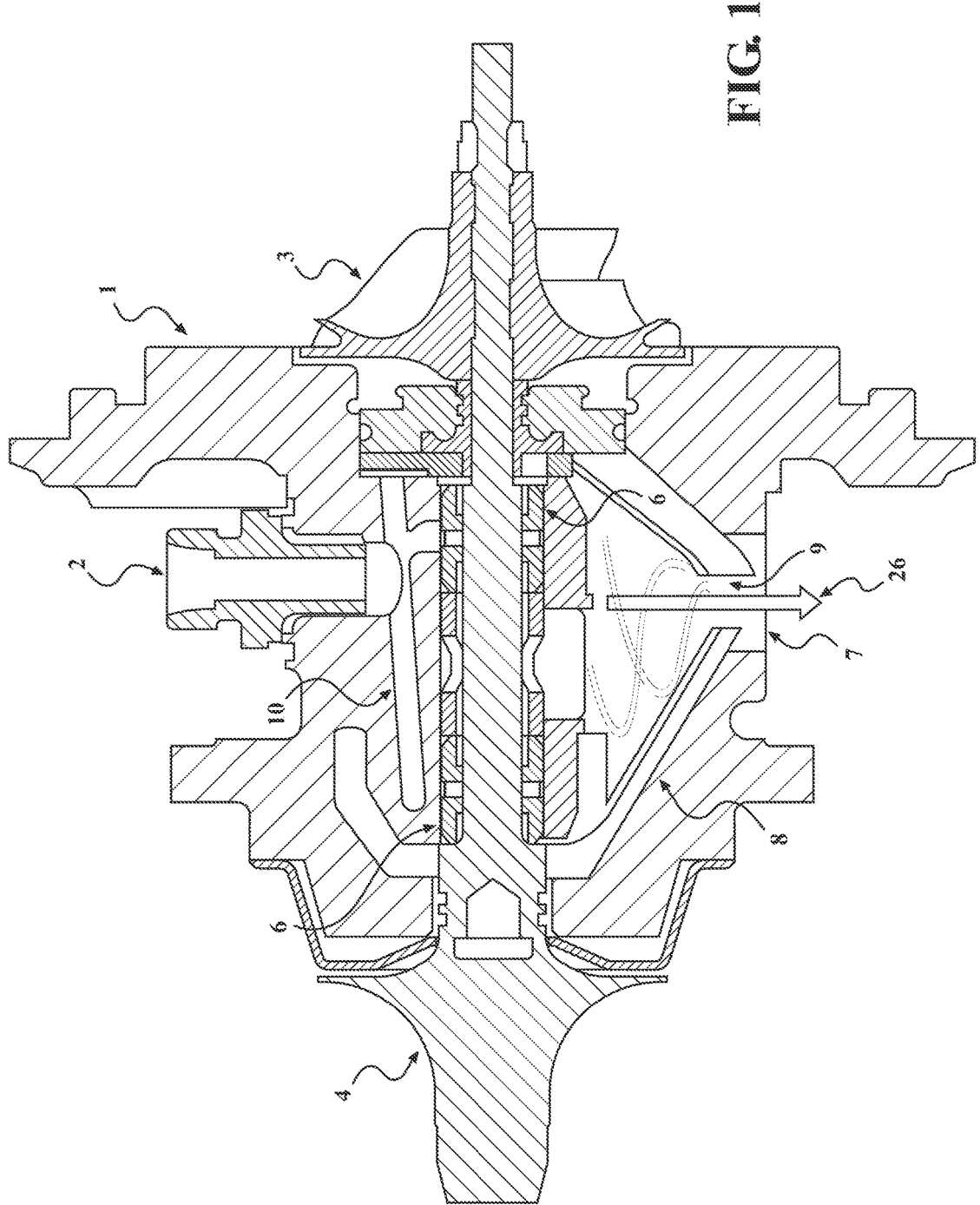
FIG. 1 shows a cut away view of a turbocharger having two spirals in the oil drain.

FIG. 1 shows a cut away view of a turbocharger having two spirals in the oil drain. A turbine wheel (4) is connected to a compressor wheel (3) by a solid turbocharger shaft (5). The turbocharger shaft (5) passes through a bearing housing (1). Oil enters the bearing housing (1) through oil inlet (2) and leaves the oil drain (8) via oil drain opening (7). The oil is conducted to the bearings (6) via an oil channel (10). The oil drain (8) has two spirals (9) molded in the wall. The oil follows path (26) as it exits from the oil drain (8).

Figure 2A:
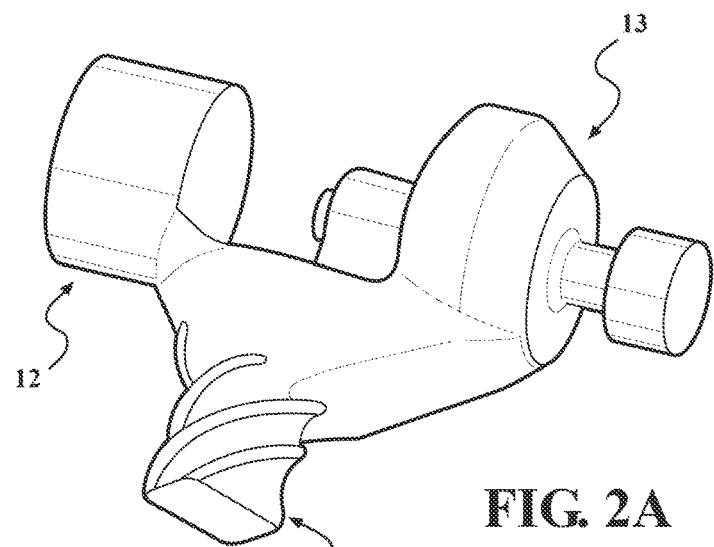
FIG. 2A shows a mold core having four spirals which can be used to create a mold for shell molding, cold box or other foundry molding processes for the core box of an oil drain having four spirals in the oil drain.

FIG. 2A shows a mold core which can be used to create a mold for shell molding, cold box or other foundry molding processes for the core box of the oil drain (8). The opening in the oil drain (8) at the end of the shaft to which the turbine wheel is attached is created by a round element (12). The opening in the oil drain at the end of the shaft to which the compressor wheel is attached is created by a round element (13). The four spirals in the oil drain are created by spirals (14).

Figure 2B:
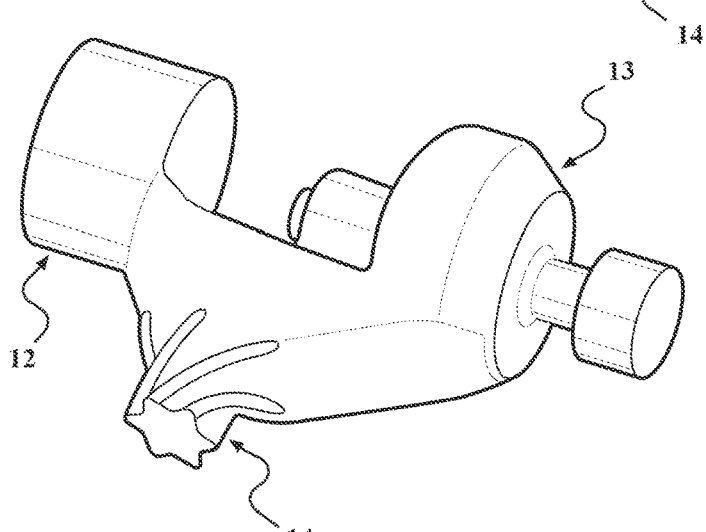
FIG. 2B shows a mold core having six spirals which can be used to create a mold for shell molding, cold box or other foundry molding processes for the core box of an oil drain having six spirals in the oil drain.

FIG. 2B shows an alternative mold core which can be used to create a mold for shell molding, cold box or other foundry molding processes for the core box of the oil drain. The opening in the oil drain at the end of the shaft to which the turbine wheel is attached is created by the round element (12). The opening in the oil drain at the end of the shaft to which the compressor wheel is attached is created by the round element (13). The six spirals in the oil drain are created by the spirals (14).

Figure 2C:
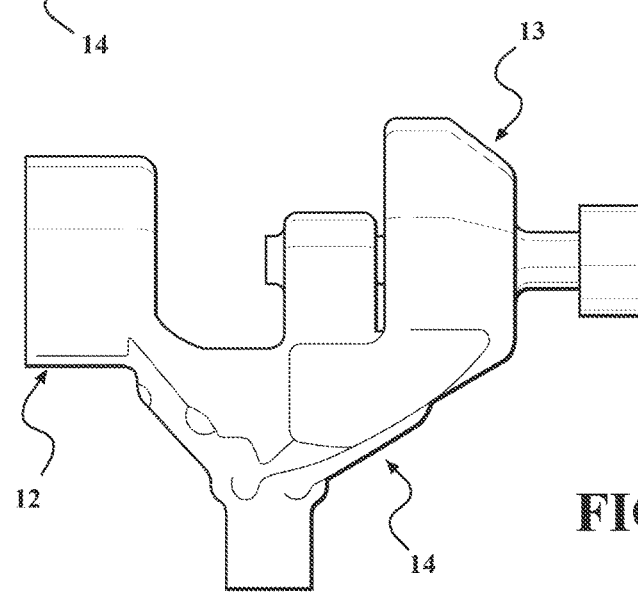
FIG. 2C shows a mold core having six short spirals which can be used to create a mold for shell molding, cold box or other foundry molding processes for the core box of an oil drain having six spirals in the oil drain.

FIG. 2C shows yet another alternative mold core which can be used to create a mold for shell molding, cold box or other foundry molding processes for the casting of the oil drain. The opening in the oil drain at the end of the shaft to which the turbine wheel is attached is created by the round element (12). The opening in the oil drain at the end of the shaft to which the compressor wheel is attached is created by the round element (13). The six spirals in the oil drain are created by the spirals (14).

Figure 3:
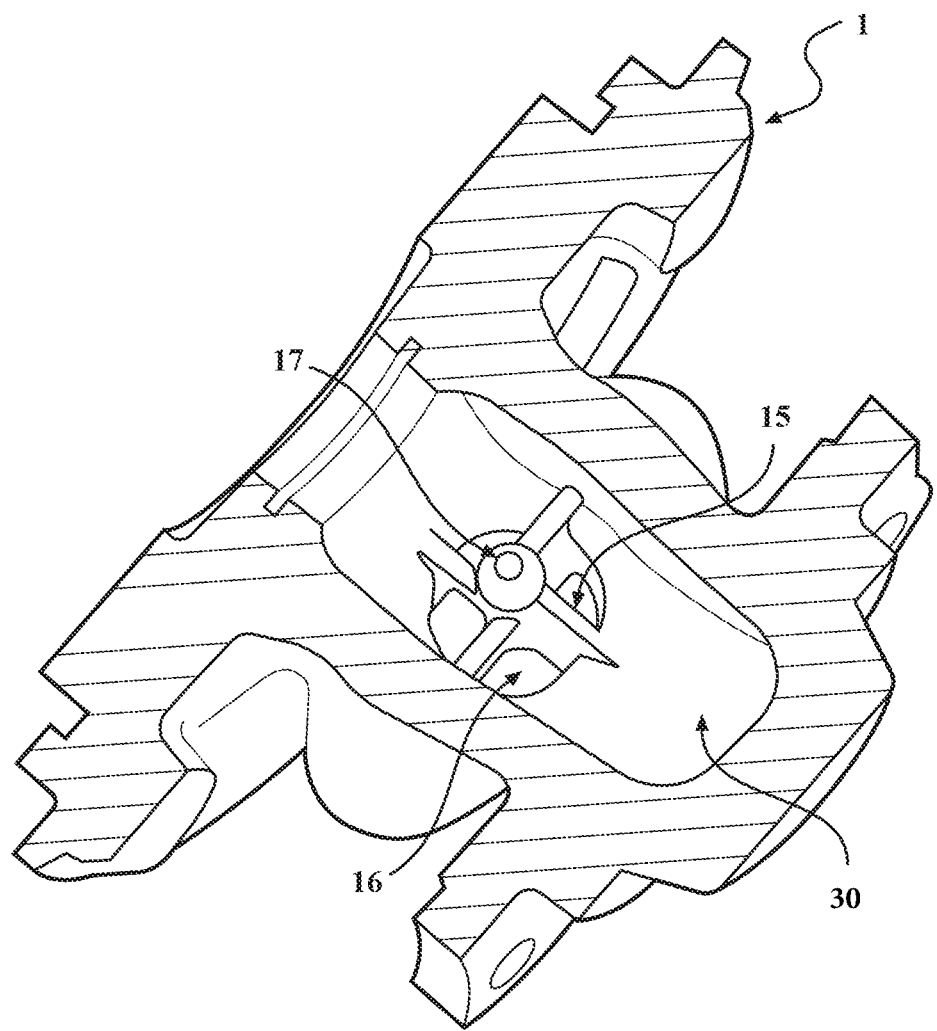
FIG. 3 shows an oil drain having an air vent and ribs which guide the oil in a swirling manner.

FIG. 3 shows an oil drain having ribs which guide the oil in a swirling manner and an air drain. The drain opening (30) is part of an oil drain assembly which is not shown in this view. The oil drain assembly is at the bottom of the bearing housing (1). The drain opening (30) has ribs (15) separating oil passages (16). In the center of the drain opening (30) there is an air vent (17) which provides air passage between an oil sump and the interior of the bearing housing (1).

Figure 4:
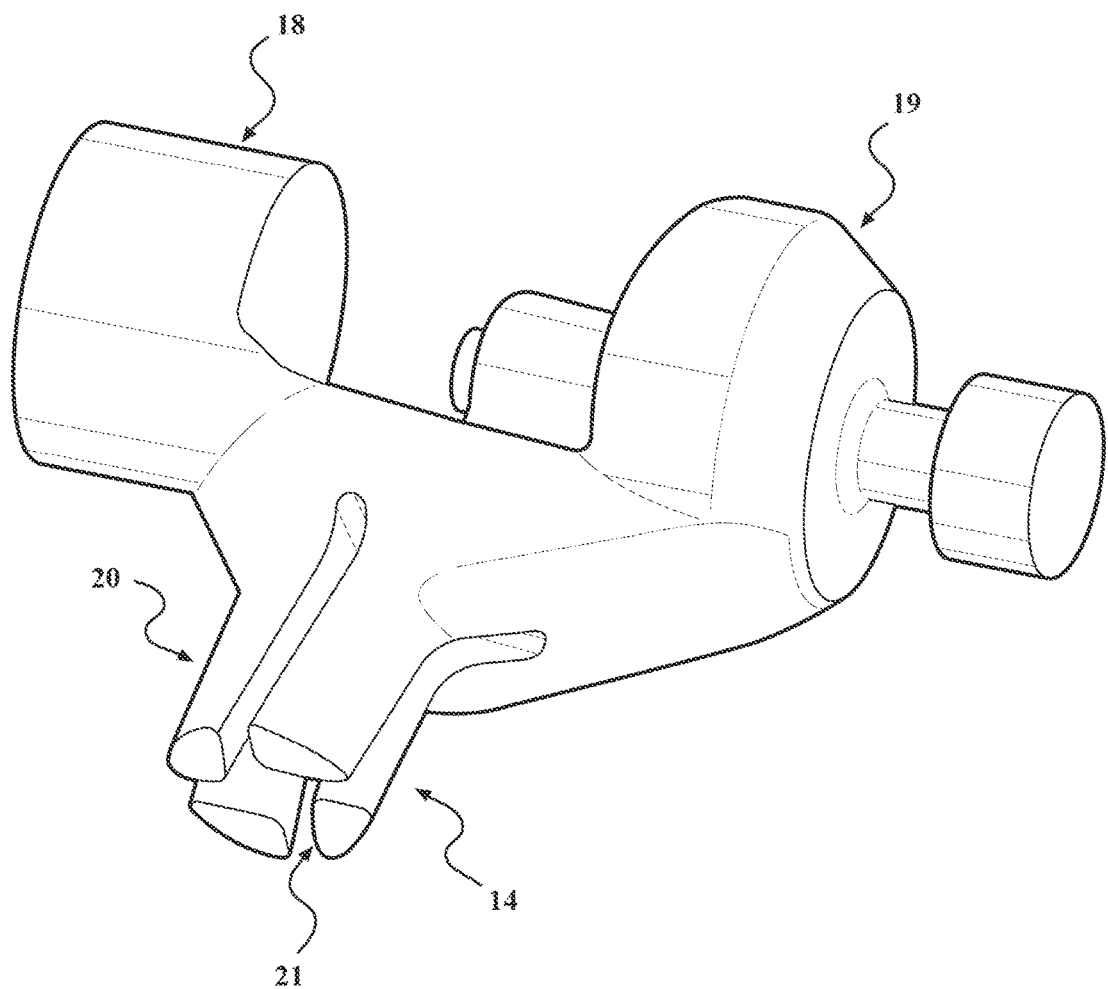
FIG. 4 shows a mold core which can be used to create a mold for shell molding, cold box or other foundry molding processes for the core box of the oil drain having ribs.

FIG. 4 shows a mold core which can be used to create a mold for shell molding, cold box or other foundry molding processes for the casting of the oil drain having ribs. The opening in the oil drain at the end of the shaft to which the turbine wheel is attached is created by a round element (18). The opening in the oil drain at the end of the shaft to which the compressor wheel is attached is created by a round element (19). The mold core has ribs (20) which created the oil passages (16 in FIG. 3). The spaces between the ribs (21) of the core mold create the ribs (15 in FIG. 3) in the oil drain.

Figure 5A:
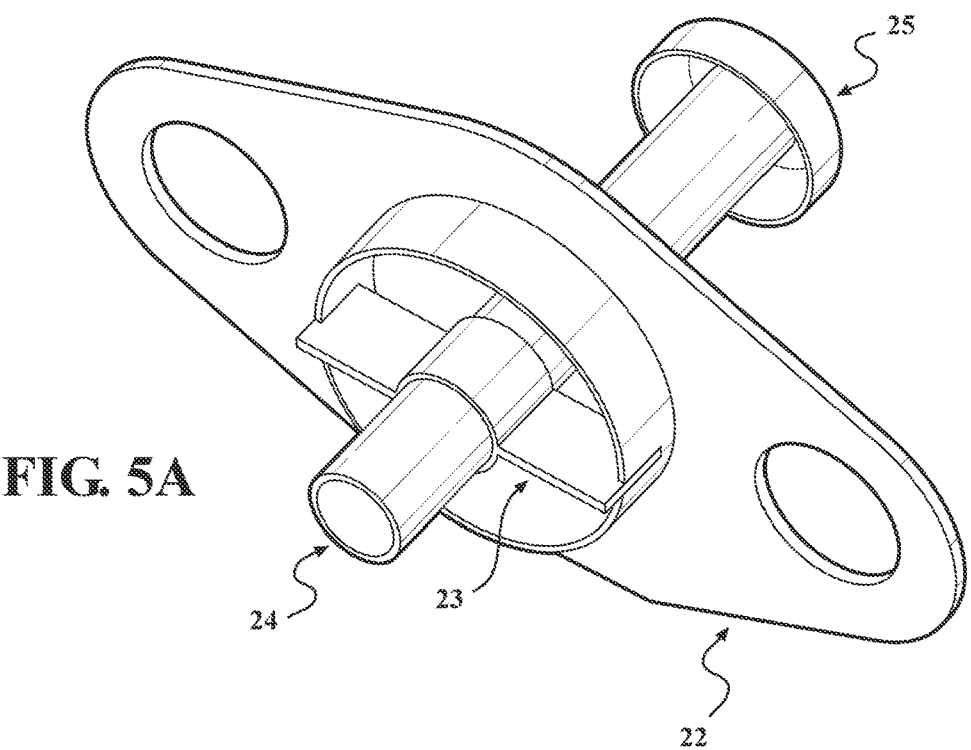
FIG. 5A shows a device which creates a swirling oil flow after the oil leaves the drain.

FIG. 5A shows a device which creates a swirling oil flow after the oil leaves the oil drain. The device has a plate (22) which may be bolted to the oil drain. In the center of the plate there is an opening having a rib (23) and a breather tube (24). At the upper end of the breather tube (24) there is a cap (25).

Figure 5B:
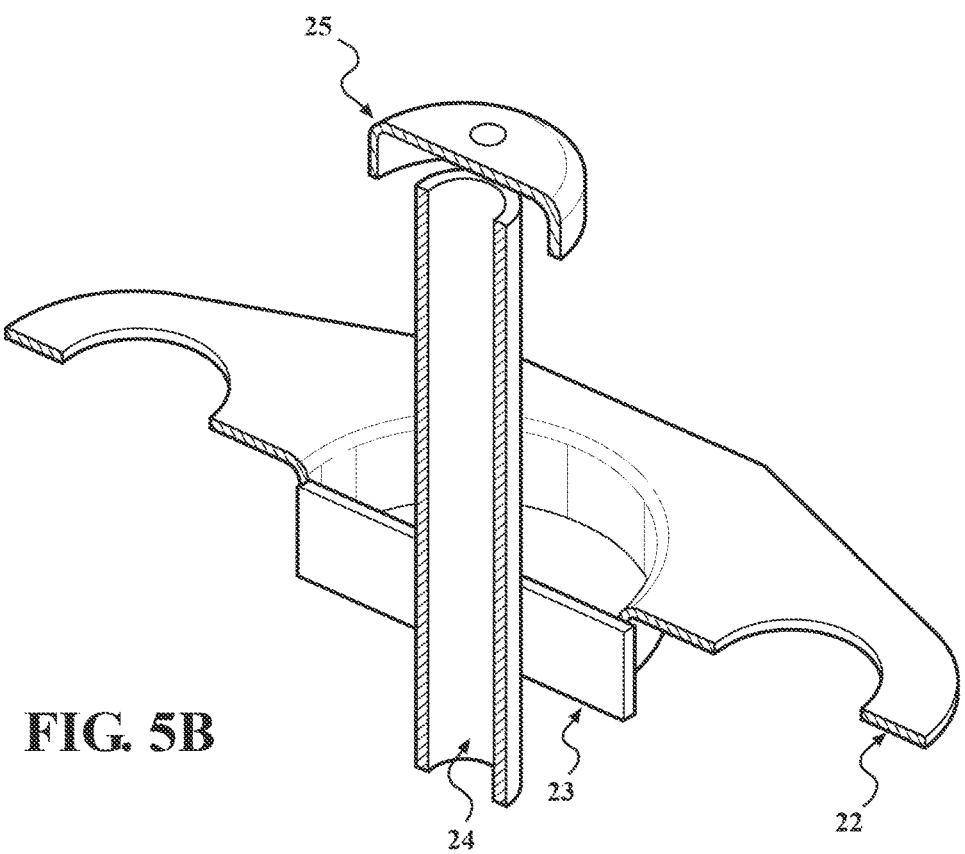
FIG. 5B shows a cutaway illustration of the device shown in FIG. 5A.

FIG. 5B shows a cutaway illustration of the device shown in FIG. 5A. The device has a plate (22) which may be bolted to the oil drain. In the center of the plate there is an opening having a rib (23) and a breather tube (24). At the upper end of the breather tube there is a cap (25).

In one embodiment, the oil drain (8) has a flow moderator comprising spirals (9 in FIG. 1) molded in the wall of the oil drain (8). The spirals (9) are indentations in the wall of the oil drain. As the oil flows through the oil drain (8) it tends to follow the spirals (9) and thus flows along the outside of the oil drain (8) leaving the center of the oil drain open. This flow pattern continues as the oil flows through the drain pipe to the oil sump. The number of spirals may vary from 2 to 8 depending upon the desired flow rate of the oil to be drained. Smaller oil drains in smaller turbochargers having lower flow rates may have fewer spirals. The center of the drain pipe and the drain opening (7 in FIG. 1) remains open, and the air pressure in the sump and the bearing housing is equalized. The pressure equalization facilitates the flow of oil from the bearing housing to the oil sump.

The size of the oil drain depends upon the volume of oil to be drained and the viscosity of the oil to be drained. The higher the volume of oil to be drained the larger the drain opening has to be to avoid having the oil fill the drain opening and the drain pipe. The higher the viscosity of the oil, the more slowly the oil will flow through the drain opening and through the drain pipe. To avoid having the slow moving oil fill the drain pipe, the drain opening must be larger for use with a more viscous oil. The correct size of the drain opening can be determined empirically since one does not have to build an entire turbocharger to measure the drainage properties of a drain opening. The drain characteristics may be determined by having the drain opening in an oil pan and circulating the desired volume of oil into the pan.

The experiment need not be done at the temperature of the turbocharger bearing housing. The oil to be used in an engine is generally specified. For example, a specific engine may require a 5W-30 motor oil meeting certain SAE standards. The oil temperature in the bearing housing is known, and the viscosity of a 5W-30 motor oil at that temperature is known. The tests of the oil drain may be conducted with an oil having the proper viscosity at room temperature. Alternatively, the size of the drain opening which will drain the desired volume of oil along the wall of the drain, while leaving the center open, can be calculated from the principles and equations of fluid dynamics.

In another embodiment, the oil drain has a flow moderator comprising ribs (15) dividing the opening of the drain. There may be 2 to 5 ribs dividing the opening. As the oil flows out of the oil drain, the ribs (15) cause the oil to swirl like water flowing out of a sink. The ribs (15) may optionally have slanted sides to further enhance the swirling motion caused by the ribs (15). Once the oil begins to swirl as it leaves the oil drain, it will continue to flow along the wall of the drain pipe leaving the center of the pipe open. In the center of the opening, the air vent (17) allows air to move between the bearing housing and the oil sump thereby equalizing pressure in the oil sump and the bearing housing. When the drain opening is divided by the ribs (15), the drain opening must be somewhat larger for the same volume of oil, having the same viscosity, in order to compensate for the volume taken up by the ribs (15). However, the ribs can readily be measured and their volume determined. From this measurement, the extra volume needed in the drain can be calculated. Optionally, if the drain opening is large enough, the air vent is not necessary.

In another embodiment, the swirling oil flow is created by a flow moderator immediately below the oil drain. The flow moderator is a plate (22) which may be bolted to the oil drain. The plate (22) may serve as a gasket between the oil drain and the oil drain pipe. In the center of the plate (22) there is a drain opening which is divided by 2 to 5 ribs (23). In the center of the drain opening there may be a breather tube (24) which allows the flow of air from the oil sump to the bearing housing. At the top of the breather tube (24) there is a cap (25) which allows air to escape from the breather tube (24), but which also prevents oil from flowing into the breather tube (24).

In another embodiment the breather tube (24) may be connected to a tube which can be open to the atmosphere. Because of the positive crankcase ventilation (PCV) system, the pressure in the crankcase and the oil sump is either at atmospheric pressure, or is at a slight vacuum. Thus, if the bearing housing is open to the atmosphere, the pressure in the bearing housing would be equal or slightly higher than the pressure in the oil sump.

Because of the large volume of cooling oil flowing through the bearing housing, the oil drain is not in a high temperature environment. Accordingly, the bearing housing drain need not be made from specialized high temperature alloys such as Inconel® alloys. Although the oil drain could be made from a wide variety of metals, for reasons of convenience and economy, ordinary grey iron is preferred. If the bearing housing is water cooled, aluminum may be used for the oil drain. Stainless steels may be used if the possibility of corrosion is a concern. Carbon steel is not a preferred metal for the oil drain. The oil drain may be machined or it may be made by a casting process such as shell molding, cold box or other for the core box investment casting. FIGS. 2A, 2B, 2C, and 4 illustrate mold cores which may be used to create the casting molds. Shell molding and green sand casting are the preferred method of manufacturing the bearing housing oil drain.

While the invention has been shown and described with respect to the particular embodiments, it will be understood by those skilled in the art that various changes and modifications may be made without departing from the scope of the present invention as defined in the following claims.

What is claimed is:

1. A turbocharger comprising:
a bearing housing for rotatably supporting a shaft interconnecting a turbine wheel and a compressor wheel and for circulating oil about the shaft, the bearing housing including an oil drain formed by an outer wall for draining the oil from the bearing housing and through an oil drain opening; and a flow moderator operatively coupled to the oil drain for maintaining the center of the drain opening free of oil whereby air may move through the center of the drain opening, the flow moderator including a plate with a flange extending towards the drain opening, at least one rib spanning the flange, and a breather tube extending axially through the plate, the at least one rib including engagement structure configured and dimensioned to receive the breather tube such that the breather tube is separated from the flange.

2. The turbocharger according to claim 1 wherein the flow moderator further includes 2 to 8 spirals formed in the outer wall of the oil drain.

3. The turbocharger according to claim 2 wherein the flow moderator includes 4 to 6 spirals.

4. The turbocharger according to claim 1 wherein the flow moderator includes 2 to 5 ribs extending across the oil drain opening.

5. The turbocharger according to claim 4 wherein the flow moderator includes 3 to 4 ribs.

6. The turbocharger according to claim 1 further comprising a cap disposed on a distal end of the breather tube.

* * * * *